United States Patent

Sunshine

Patent Number: 5,149,598
Date of Patent: Sep. 22, 1992

[54] BATTERY ARRANGEMENT

[75] Inventor: Morton Sunshine, Ft. Lauderdale, Fla.

[73] Assignee: ACR Electronics, Inc., Ft. Lauderdale, Fla.

[21] Appl. No.: 728,225

[22] Filed: Jul. 11, 1991

[51] Int. Cl.$^5$ .............................................. H01M 2/00
[52] U.S. Cl. .......................................... 429/1; 429/65; 429/123; 429/178; 429/185
[58] Field of Search ....................... 429/65, 99, 96, 100, 429/110, 116, 163, 178, 180, 185, 1, 123, 119

[56] References Cited

U.S. PATENT DOCUMENTS

| | | | |
|---|---|---|---|
| 3,473,964 | 10/1969 | Leftault, Jr. | 429/65 |
| 3,753,781 | 8/1973 | Parker et al. | 429/65 X |
| 4,724,189 | 2/1988 | Chase | 429/99 |
| 5,001,772 | 3/1991 | Holcomb et al. | 429/99 X |

Primary Examiner—Anthony Skapars
Attorney, Agent, or Firm—Rohm & Monsanto

[57] ABSTRACT

A battery system for use in a battery-operated device, such as a rescue light or radio used in a hostile environment, employs at least one battery element contained within a tubular support member. In embodiments which employ multiple battery elements, the battery elements are in electrical communication with one another, illustratively by welding or soldering their teminals to one another. At one end of the tubular element, a terminal of the battery system is covered entirely by a seal formed of a resilient material. The seal additionally closes the entire end of the tubular member. At the second end of the tubular member, a second seal is provided for closing the second end of the tubular member, but not covering the second battery supply terminal. The battery system operates in conjunction with a housing for the battery-operated device which may have arranged therein a pointed contact which penetrates the first seal so as to achieve electrical communication with the first contact of the battery supply. The battery supply is urged toward the pointed contact by a spring which is contained within a closure member which seals an aperture of the housing of the battery-operated device. The spring is configured so that it will not penetrate the first seal in the event that the battery system is incorrectly installed in the rescue light. In other embodiments, the contact within the housing is blunt, and penetration of the seal is achieved by a pointed portion on the spring.

20 Claims, 3 Drawing Sheets

BATTERY ARRANGEMENT

BACKGROUND OF THE INVENTION

This invention relates generally to battery powered systems, such as lighting and radio systems, and more particularly, to a battery arrangement for a submersible device which is powered by batteries in a fluid-tight arrangement.

Battery-operated rescue lights and radio systems have found significant commercial acceptance and have proven themselves to be useful in saving lives, particularly at sea. One well known rescue light employs a housing which contains a strobe lamp and associated flash circuitry. The circuitry and the lamp are energized by a battery arrangement which is formed as a unit with a threaded closure. The closure is accommodated in an aperture through the housing and seals same whereby the sea water is precluded from entering the housing.

This known arrangement suffers from several drawbacks. First, the known battery apparatus is expensive. The closure, which generally is in the form of a brass end cap, is permanently bonded to the battery element, resulting in a rather high cost. Moreover, United States Coast Guard regulations require that the battery units be discarded after a predetermined period of time, illustratively on the order of one (1) year. Thus, the expense is incurred irrespective of whether the battery is used.

It is often desirable to carry additional batteries for the rescue lamp. However, in addition to the expense of the known battery arrangements, such arrangements are rather bulky and heavy, in view of the brass closure fitting bonded thereto. It is further problem with conventional battery powered systems containing polarity sensitive circuitry, the installation of the battery in reverse polarity will result in failure of the apparatus to operate, and may also cause damage to the circuitry and/or the battery. There is, therefore, a need for a replaceable battery system which avoids the problems associated with reverse polarization caused by incorrect installation of the battery.

It is, therefore, an object of this invention to provide a simple and inexpensive water-tight battery arrangement.

It is another object of this invention to provide a battery system for a rescue light which can easily and inexpensively be replaced.

It is also an object of this invention to provide a battery arrangement which can withstand immersion without damage or creating an electrical fault.

It is a further object of this invention to provide a battery system which has a long shelf life.

It is additionally an object of this invention to provide a battery system which provides a lengthened period of operation of a rescue lamp.

It is yet a further object of this invention to provide a sealed battery system for use in battery-operated devices which are subjected to immersion and corrosive environments.

It is yet another object of this invention to improve the duration of operability of battery-operated systems in hostile environments.

It is also an object of this invention to provide a battery system which precludes the formation of a reverse polarized circuit, so as to prevent useless and/or damaging discharge in a battery operated device.

It is yet an additional object of this invention to provide a battery system which precludes the formation of a reverse-polarized circuit, so as to prevent damage to polaritysensitive circuitry in a battery-operated device.

SUMMARY OF THE INVENTION

The foregoing and other objects are achieved by this invention which provides, in a first aspect thereof, a system for supplying electrical power to a battery-operated device which is intended to be subjected to submersion in an ambient fluid, illustratively water. The system is of the type which is provided with a battery element having first and second electrical terminals. In accordance with the invention, a battery supply is provided for containing the battery element. The supply is provided with a substantially tubular support member which supports the battery element. In some embodiments, a plurality of battery elements are contained within the substantially tubular support member. The supply is provided with first and second battery supply terminals which are arranged on respective ones of the first and second ends of the tubular support member. In some embodiments, the battery supply terminals are the terminals of one or more battery elements within the substantially tubular support member, as described below. A first seal, which is formed of a resilient material, is arranged to overlie and render inaccessible to the ambient fluid, the first battery supply terminal. A second seal, which is arranged in the vicinity of the second end of the substantially tubular support member, prevents entry of the ambient fluid into the tubular support member, and the second battery supply terminal is permitted to remain exposed so that electrical contact can easily be made therewith. Further, with respect to the invention, the submersible battery-operated device is provided with a housing having an aperture therethrough for accommodating the battery supply. A contact is provided, within the housing in some embodiments, for piercing the first seal and communicating electrically with the first battery supply terminal. The aperture in the housing is closed by means of a closure member which is configured to provide a sealed closure of the aperture. Finally, a resilient biasing element is provided for urging the battery supply into communication with the contact in the housing.

The resilient biasing element is, in certain embodiments, configured as a spring which is adapted to communicate electrically with the second battery supply terminal and to urge the battery supply into communication with the first seal and the first battery supply terminal. As stated, in some embodiments of the invention, the contact within the housing has a pointed portion which penetrates the first seal to achieve the electrical communication with the first battery supply terminal. The spring is configured so that, in the event that the battery supply is installed incorrectly, the spring will not penetrate the first seal or otherwise achieve an electrical communication with the first battery supply terminal. Preferably, the spring is fixed or otherwise retained within the closure element so as to reduce the possibility that the spring will become lost, and to minimize the number of parts which must be handled by a user during replacement of the battery supply for the submersible device.

In other embodiments, the contact within the housing is blunt and unable to pierce the resilient seal. Proper polarization is achieved by installing the exposed terminal of the battery supply in contact with the blunt terminal. Piercing of the seal is achieved, in such embodiments, by a pointed contact installed on, or formed integrally with, the resilient spring. The pointed portion may be an extended end portion of the spring wire itself.

The invention includes within its scope a battery arrangement intended for a fluidtight application. The battery arrangement, as previously noted, is formed of at least one battery member for supplying the electrical energy. In embodiments where plural battery members are employed, the battery members are arranged to be in electrical communication with one another, and are contained within a substantially tubular support member. The substantially tubular support member supports the one or more battery members therewithin in an electrically serial arrangement, and has first and second ends. A first seal which is formed of a resilient material is arranged to overlie and render inaccessible to the ambient fluid, which may be water, the first battery supply terminal. Moreover, a second seal is arranged in the vicinity of the second end of the substantially tubular support member for preventing entry of the ambient fluid into the substantially tubular support. In certain environments, particularly in salt water environments, the entry of brine into the substantially tubular member could result in damage to, and early failure of, the battery system.

In a practical embodiment of the invention, the first seal is formed of a silicone RTV material which is arranged to seal the interior of the first end of the substantially tubular support member. Preferably, the silicone is applied in a liquid state so that the resultant seal conforms to the desired configuration. Similarly, the second seal is formed of a silicone material within the second end of the substantially tubular support member, in a region which surrounds the second battery supply terminal. In this embodiment, the second battery supply terminal remains exposed.

The substantially tubular support member can be formed of a plastic sleeve. Additionally, the battery members therein can be welded to one another at respective terminals thereof, and thereby prevent discontinuation of the source of the electrical power.

The sealing of one or more battery elements within a sleeve of impervious material prolongs the shelf life of the battery system, and the period of operability of the system while in use. Oftentimes, the battery systems are stored in nautical environments, such as on boats or ships, where the air contains higher levels of humidity and salt, both of which cause corrosion and deterioration of the contacts and metal cases of the battery elements.

BRIEF DESCRIPTION OF THE DRAWING

Comprehension of the invention is facilitated by reading the following detailed description, in conjunction with the annexed drawing, in which.

DETAILED DESCRIPTION

Figure 1:
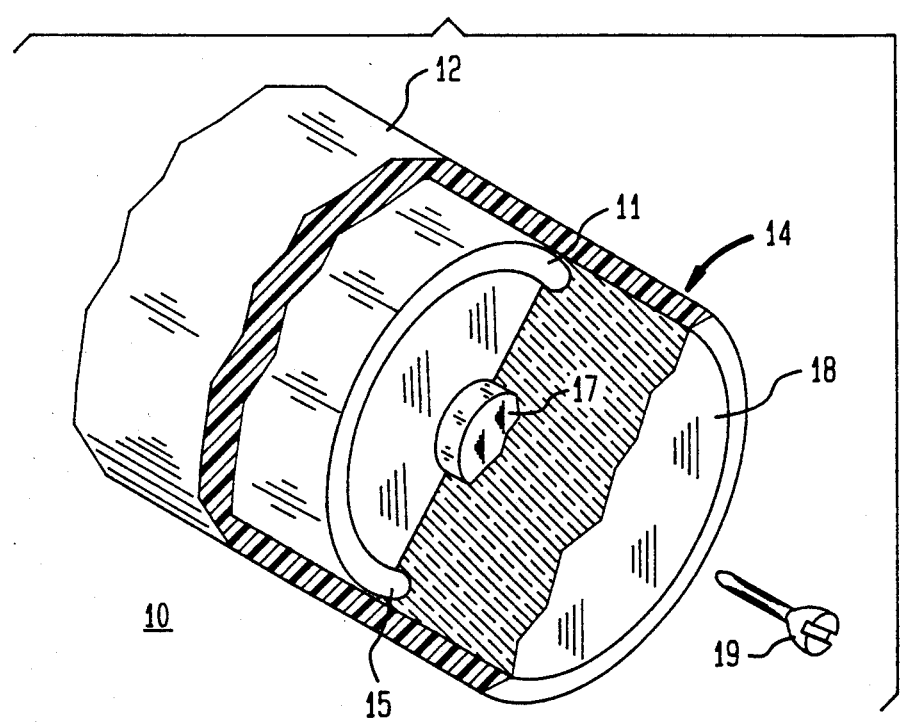
FIG. 1 is an isometric, partially fragmented representation of a first end of a battery supply system showing an end seal and a terminal member for penetrating the seal.

FIG. 1 is a partially fragmented isometric representation of a battery supply system 10 constructed in accordance with the invention. In this embodiment, a plurality of battery elements 11, only one of which is shown in this figure, are axially arranged within a tubular support member 12. The battery elements are in electrical communication with one another, illustratively in a serial electrical arrangement, by having their respective terminals which are contained within the tubular support member, and which are not shown in this figure, welded to one another.

Tubular support member 12 has a first end 14 at which is disposed a specific battery element 15. Battery element 15, as shown, is substantially cylindrical in shape, in this embodiment, and has an axial electrical terminal 17 disposed near first end 14 of the tubular support member. Also as shown, the first end of the tubular support member extends beyond electrical terminal 17, whereby the electrical terminal is disposed entirely within the tubular support member.

A first seal 18 is arranged within first end 14 of tubular support member 12, so as to seal the first end entirely. In practice, first seal 18 may be formed of a silicone RTV material, which, during manufacture of the battery supply system, is deposited in a liquified form so as to insure complete communication with the contours formed by the electrical terminal, the battery element, and the interior of the first end of the tubular support member. The liquified silicone material then is permitted to harden, illustratively by removing a solvent therefrom, so as to produce a resilient permanent seal at the first end of the tubular support member. Since the tubular support member is itself formed of a waterproof material, such as a plastic sleeving, the entire first end of the battery supply system is sealed to prevent entry of almost all ambient fluids, particularly water.

FIG. 1 further shows a contact member 19 which is intended to be coupled within a housing (not shown) of a device intended to be powered by the battery supply system, such as a rescue light (not shown). Contact member 19 has a sharpened end directed toward first seal 18 such that as the battery supply system is urged toward the contact member, the contact member penetrates the resilient first seal 18 until it communicates electrically with electrical terminal 17. In this embodiment, the resilient first seal will permit penetration thereinto by the contact member and conform thereto so as to maintain a fluid tight seal notwithstanding the penetration.

Figure 2:
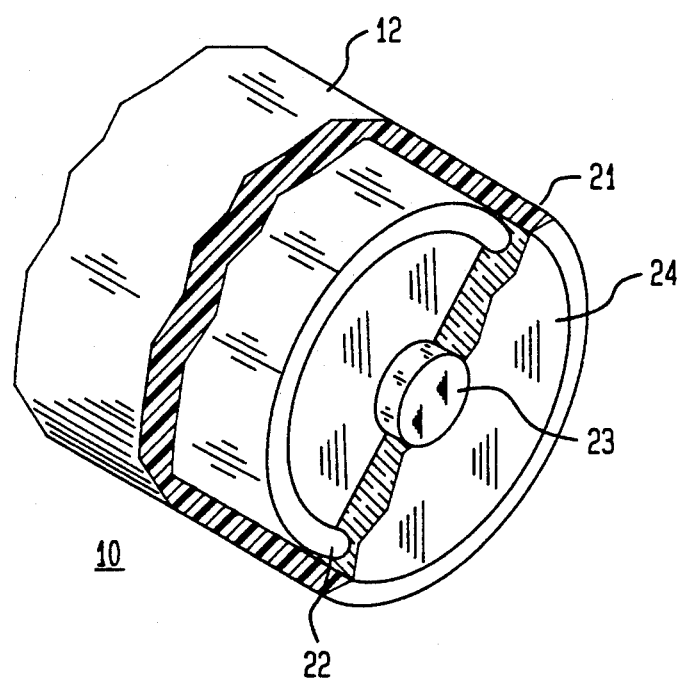
FIG. 2 is an isometric, partially fragmented representation of the second end of the battery supply system of FIG. 1 showing an exposed battery element terminal surrounded by a seal.

FIG. 2 is a partially fragmented isometric representation of a second end 21 of battery supply system 10. At this end of the battery supply system, a battery element 22 has an electrical terminal 23 which is substantially contained within second end 21 of tubular support member 12. Electrical terminal 23 is surrounded by a second seal 24 which, as discussed hereinabove with respect to first seal 18, is deposited in a substantially liquified form. However, the flat, outermost surface of the electrical terminal remains exposed after deposition of the second seal.

In a practical embodiment of the invention, a resilient spring member (not shown) which may be of the type which conventionally are used in flashlights, communicates electrically with the exposed portion of electrical terminal 23 and also applies a biasing force which urges the battery supply system into communication with contact member 19, as shown in FIG. 1. In such an embodiment, the spring therefore serves as an electrical contact for terminal 23. Preferably, the spring should have a somewhat flattened portion where it communicates with the electrical terminal. In this manner, should the battery supply system be installed incorrectly, such as in reverse polarity, the spring will not penetrate first seal 18. This ensures that only proper installation of the battery supply system into the device being powered will result in completion of an electrical circuit, and prevents damage to polarity-sensitive electronic circuitry, such as is present in flash-type rescue light systems.

Figure 3:
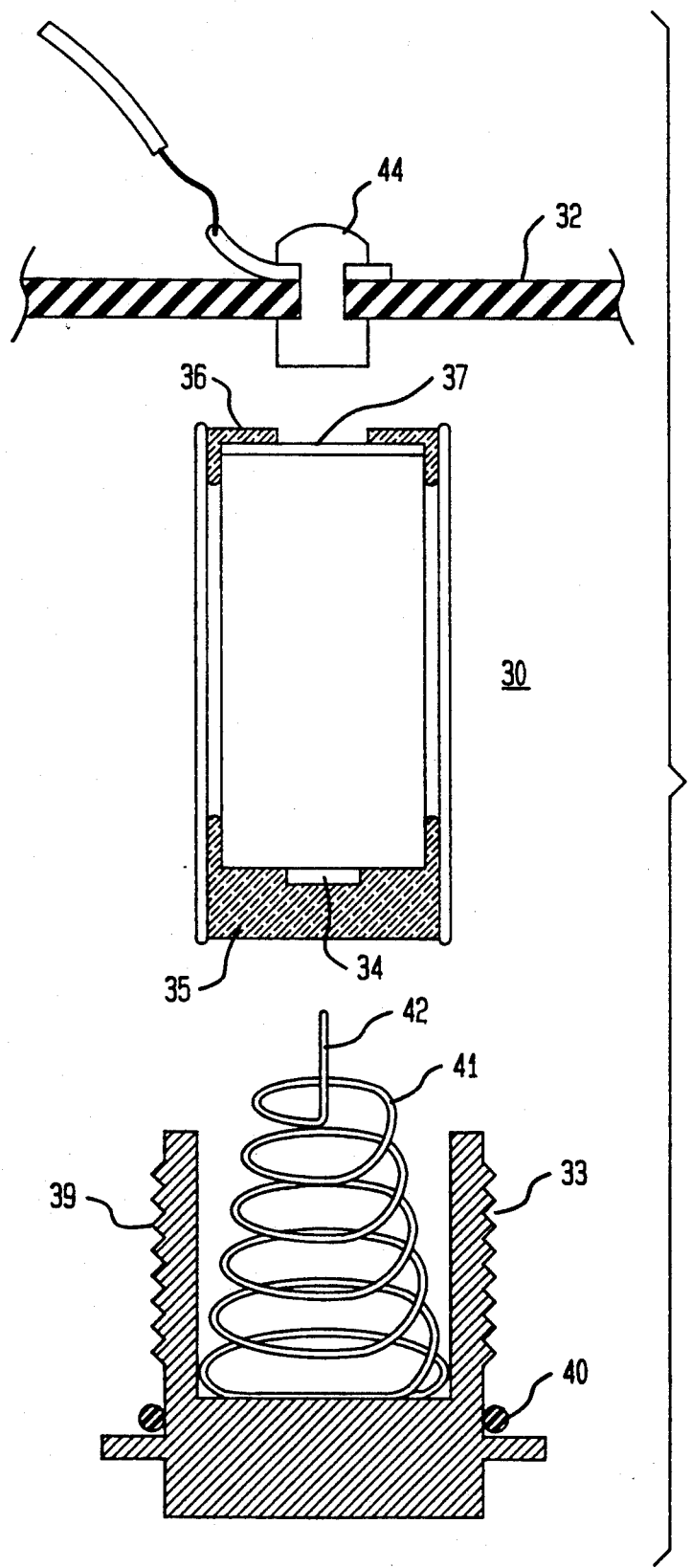
FIG. 3 is a cross-sectional plan view of an specific illustrative embodiment of the invention showing a battery system in the context of the housing and closure of a battery-operated device.

FIG. 3 is a plan, cross-sectional representation of an embodiment of the invention, showing the manner in which a battery system 30 is coupled electrically to contacts within the housing of a battery-operated device, which is not shown in its entirety and generally designated with the numeral 32, and a closure element 33 for an aperture (not specifically shown) through the housing of battery-operated device 32. Battery system 30 has a first terminal 34 which is covered under a resilient seal 35, as described hereinabove. The other end of battery system 30 has a resilient seal 36 which has a central opening through which is accessible a contact 37 of the battery system.

Closure element 33, which in this embodiment is an end cap, has a threaded portion 39 for engaging mating threads (not shown) in the housing. The closure element has an O-ring 40 installed thereon which produces a fluid tight seal when compressed. Inside of the closure element is a spring 41 which has a pointed portion 42 which pierces resilient seal 35 and makes electrical contact with terminal 34. In addition, the spring applies a force on the battery system whereby contact 37 thereof is urged into communication with a housing contact 44. As shown, housing contact 44 is blunt and will not penetrate resilient seat 35 in the event the battery system is installed in reverse polarity.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for supplying electrical power to a battery powered device which is submersible in an ambient fluid, the system being of the type wherein there is provided at least one battery element having first and second electrical terminals, the system comprising:
    a battery supply for containing the battery element, the battery supply being provided with;
    a substantially tubular support member for supporting the battery element therewithin;
    first and second battery supply terminals arranged substantially on respective ones of first and second ends of said substantially tubular support member;
    first seal means formed of a resilient material arranged to overlie and render inaccessible to said ambient fluid said first battery supply terminal; and
    second seal means arranged in the vicinity of said second end of said substantially tubular support member for preventing entry of the ambient fluid into said substantially tubular support member, said second battery supply terminal being electrically exposed;
    a housing for the battery-operated device, said housing having an aperture therethrough for accommodating said battery supply;
    contact means for piercing said first seal means and communicating electrically with said first battery supply terminal;
    closure means for sealingly closing said aperture through said housing; and
    resilient biasing means for urging said battery supply into communication with said contact means.

2. The system of claim 1 wherein said resilient biasing means comprises spring means adapted to communicate electrically with said second battery supply terminal and to urge said battery supply into communication with said first seal means and said first battery supply terminal.

3. The system of claim 2 wherein said resilient biasing means is configured to be incapable of communicating with said first battery supply terminal in the event said battery supply is incorrectly installed.

4. The system of claim 1 wherein said resilient biasing means is fixed within said closure means.

5. The system of claim 1 wherein said second battery supply terminal is an electrical terminal of one of said battery elements.

6. The system of claim 1 wherein said closure means is provided with a screw threaded portion for engaging with said housing in the vicinity of said aperture.

7. The system of claim 1 wherein said first battery supply terminal is an electrical terminal of one of said battery elements.

8. A battery arrangement for a fluid-tight application in an ambient fluid, the battery arrangement comprising:
    at least one battery member for supplying electrical energy;
    a substantially tubular support member for supporting said at least one battery member therewithin in an electrically serial arrangement, said substantially tubular support member having first and second ends;
    first and second battery supply terminals arranged at respective ones of said first and second ends of said substantially tubular support member;
    first seal means formed of a resilient material arranged to overlie and render inaccessible to the ambient fluid said first battery supply terminal; and
    second seal means arranged in the vicinity of said second end of said substantially tubular support member for preventing entry of the ambient fluid into said substantially tubular support member, said second battery supply terminal being electrically exposed.

9. The battery arrangement of claim 8 wherein said first seal means is formed of a silicone sealing material arranged to seal the interior of said first end of said substantially tubular support member.

10. The battery arrangement of claim 8 wherein said second seal means is formed of a silicone sealing material arranged to seal the interior of said second end of said substantially tubular support member, in a region surrounding said second battery supply terminal.

11. The battery arrangement of claim 8 wherein said substantially tubular support member is formed of a plastic sleeve.

12. The battery arrangement of claim 8 wherein there is further provided a second battery member arranged within said substantially tubular support member, said second battery member and said battery member being in electrical communication with one another.

13. The battery arrangement of claim 12 wherein said battery members are welded to one another at respective terminals thereof.

14. A system for supplying electrical power to a battery powered device which is submersible in an ambient fluid, the system being of the type wherein there is provided at least one battery element having first and second electrical terminals, the system comprising:
  a battery supply for containing the battery element, the battery supply being provided with;
    a substantially tubular support member for supporting the battery element therewithin;
    first and second battery supply terminals arranged substantially on respective ones of first and second ends of said substantially tubular support member;
    first seal means formed of a resilient material arranged to overlie and render inaccessible to said ambient fluid said first battery supply terminal; and
    second seal means arranged in the vicinity of said second end of said substantially tubular support member for preventing entry of the ambient fluid into said substantially tubular support member, said second battery supply terminal being electrically exposed;
  a housing for the battery-operated device, said housing having an aperture therethrough for accommodating said battery supply;
  contact means for communicating electrically with said second battery supply terminal, said contact means being incapable of piercing said first seal means;
  closure means for sealingly closing said aperture through said housing; and
  resilient biasing means for urging said battery supply into communication with said contact means, said resilient biasing means being provided with a pointed portion for piercing said first seal means and making electrical communication with said first battery supply terminal.

15. The system of claim 14 wherein said resilient biasing means comprises spring means adapted to communicate electrically with said first battery supply terminal and to urge said battery supply into communication with said first seal means and said first battery supply terminal.

16. The system of claim 15 wherein said pointed portion of said resilient biasing means comprises an extended portion of said spring means.

17. A system of supplying electrical power to a battery powered device which is submersible in an ambient fluid, the system being of the type wherein there is provided at least one battery element having first and second electrical terminals, the system comprising:
  a battery supply for containing the battery element, the battery supply being provided with;
    a tubular support member for supporting the battery element therewithin;
    first and second battery supply terminal arranged substantially on respective ones of first and second ends of said substantially tubular support member;
    first seal means formed of a resilient material arranged to overlie and render inaccessible to said ambient fluid said first battery supply terminal; and
    second seal means arranged in the vicinity of said second end of said substantially tubular support member for preventing entry of the ambient fluid into said substantially tubular support member, said second battery supply terminal being electrically exposed; and
  first and second contact means for communicating electrically with said first and second battery supply terminals respectively, said second contact means being incapable of piercing said first seal means.

18. A battery system for communicating electrically with an electrical contact during a fluid-tight application in an ambient fluid, the battery system comprising:
  a first battery element for providing electrical energy;
  a tubular support member for supporting said first battery element therewithin;
  first and second battery supply terminals arranged substantially on respective ones of first and second ends of said tubular support member, said first battery supply terminal for communicating electrically with the electrical contact during the fluid-tight application;
  first seal means arranged in the form of a layer of a resilient material arranged to overlie said first battery supply terminal for rendering inaccessible to the ambient fluid said first battery supply terminal prior to and during the electrical communication between said first battery supply terminal and the electrical contact during the fluid tight application of the battery system; and
  second seal means arranged in the vicinity of said second end of said substantially tubular support member for preventing entry of the ambient fluid into said substantially tubular support member.

19. The battery system of claim 18 wherein there is further provided a second battery element arranged within said substantially tubular support member, said first battery element and said second battery element being in electrical communication with one another.

20. The battery system of claim 19 wherein said first and second battery supply terminals are respective terminals of said first battery element and said second battery element.

* * * * *